E. WALKER.
ICE CREAM DIPPER.
APPLICATION FILED OCT. 4, 1909. RENEWED OCT. 12, 1912.
1,138,704.
Patented May 11, 1915.
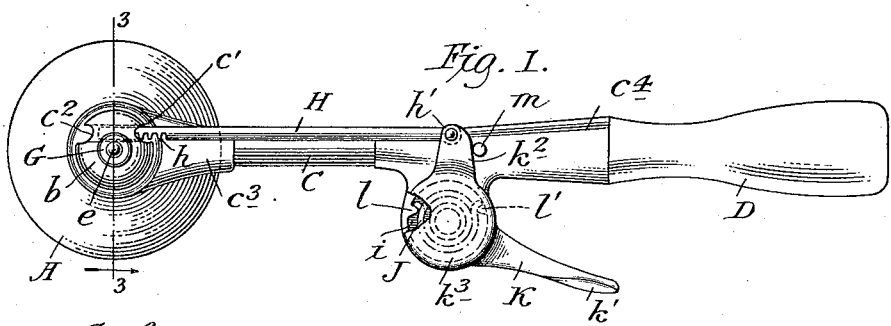
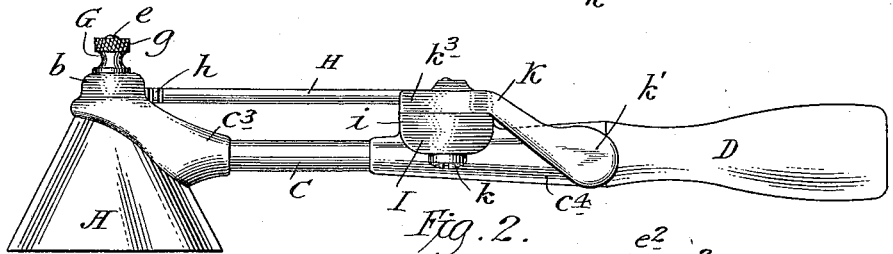
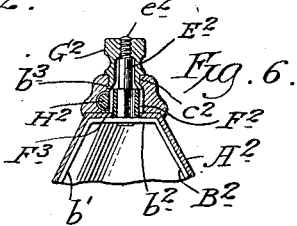
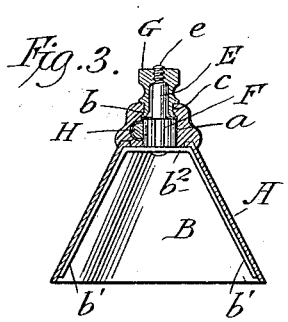
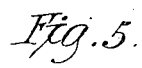
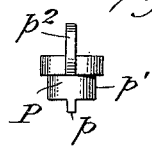
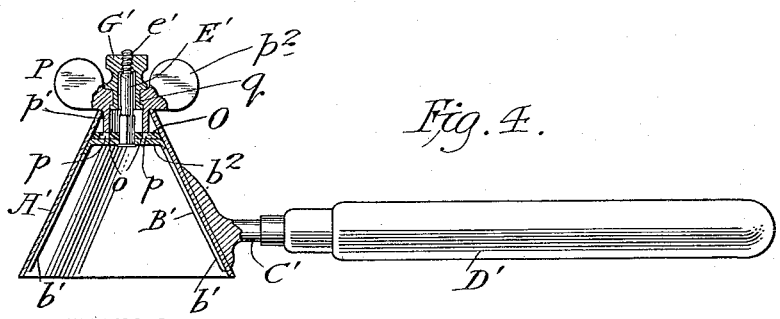
WITNESSES
A. V. Appleman
M. C. Powell
INVENTOR,
Edwin Walker,
BY
Griffin Bernhard
ATTORNEYS

UNITED STATES PATENT OFFICE.

EDWIN WALKER, OF ERIE, PENNSYLVANIA.

ICE-CREAM DIPPER.

1,138,704.         Specification of Letters Patent.       Patented May 11, 1915.

Application filed October 4, 1909, Serial No. 520,942. Renewed October 12, 1912. Serial No. 725,538.

*To all whom it may concern:*

Be it known that I, EDWIN WALKER, a citizen of the United States, residing in Erie, in the county of Erie and State of Pennsylvania, have invented a certain new and useful Ice-Cream Dipper, of which the following is a specification.

This invention is an ice cream dipper of simple construction and economical to manufacture, yet so organized that the parts thereof may be quickly assembled, and, also, quickly dismantled by the user for the purpose of thoroughly cleaning the same.

Sanitary authorities have called attention to the fact that considerable danger resides in dispensing cream from insanitary dippers, i. e., dippers which permit the lodgment of cream in or around such operating parts of the device as cannot be thoroughly cleansed or sterilized, at least without much greater care than is ordinarily bestowed in cleansing utensils of this character.

Among the features of novelty in the present invention may be mentioned means for mounting the scraper, means for operating the scraper, and means for mounting and dismounting said operating means whereby the scraper may be expeditiously removed from the bowl or cup.

In the accompanying drawings I have illustrated different practical embodiments of the invention, but the constructions shown therein are to be understood as illustrative, only, and not as defining the limits of the invention.

Figure 1 is a plan view illustrating one embodiment of the invention wherein a spring actuated operating member is positioned on the handle for conveniently rotating the scraper. Fig. 2 is a side view of the device shown in Fig. 1. Fig. 3 is a cross section on the line 3—3 of Fig. 1. Fig. 4 is a view, partly in side elevation and partly in vertical section, illustrating another embodiment of means for rotating the scraper. Fig. 5 is a detail view of the scraper operating element illustrated in Fig. 4. Fig. 6 is a vertical section through a part of the mold and the scraper operating devices illustrating a preferred means for securing the removal of the scraper without disturbing the operating means for said scraper.

In the embodiment of the invention shown in Figs. 1, 2 and 3 the dipper consists of a cup or mold, A, a scraper, B, interiorly of said cup, a frame, C, a handle, D, and operating means, one member of which is positioned on the handle, for imparting rotary movement to said scraper.

The cup is provided in its bottom with an opening, $a$, and said bottom of the cup is extended as at $b$ for the purpose of providing a chamber which will receive a stem of the scraper, a pinion, and an operating member for said pinion, substantially as shown in Fig. 3. The extension, $b$, at the closed bottom of the cup is provided with an opening, $c$, which lies in the plane of the axis of the cup, and said extension is provided in its respective sides with other openings, $c'$, $c^2$, as shown in Fig. 1, for the reception of a rack, as will presently appear.

Scraper, B, comprises two members, $b'$, and a transverse web, $b^2$, connecting said members, $b'$. The scraper may be composed of sheet metal struck up and bent to the form shown in Fig. 3, but it may be composed of cast metal, or of any other construction preferred by those skilled in the art. Said scraper is provided with a stem, E, which stem is attached rigidly to the web or head, $b^2$, of the scraper. The stem is provided at its outer end with a number of male threads, $e$, and secured rigidly to the stem is the pinion, F. The stem is adapted to pass through the chamber, $a$, in the extension, $b$, of the cup or mold, whereas the pinion, F, is positioned to occupy the chamber, $a$. When the scraper is positioned within the cup, as shown in Fig. 3, the stem, E, and pinion, F, are adapted to turn or rotate easily within the extension, $b$, of cup, A, but said stem and the pinion are adapted to be withdrawn from the cup along with the scraper, B, for the reason that the pinion and the stem will slide easily out of the cup when the scraper is withdrawn from the open side thereof.

For retaining the scraper in its operative position within the cup I employ means separate from the scraper operating mechanism. Said retaining means in the embodiment of the invention shown in Figs. 1 to 3 inclusive, consists, preferably, of a nut, G, which is adapted for engagement with the threaded part, $e$, of scraper stem, E, said nut having rotatable connection with the extension, $b$, of the cup or mold. As shown more clearly in Fig. 3, the nut is provided with an annular recess or groove adapted to receive an edge portion of the extension, $b$, on cup, A, whereby the nut is connected with the extension, b, and at the same time it is free to turn with respect thereto. The nut may be said to have a swiveled connection with the extension of the cup, which swiveled connection precludes the nut from becoming detached from the cup, and at the same time enables said nut to be easily rotated by hand when it is desired to connect or disconnect the scraper. The nut, G, is positioned on the extension of the cup so that the axis of the nut is in line with the axis of the cup, and said nut is shown in Fig. 2 as having a milled edge, g, positioned exteriorly to the cup, whereby an operator is able to easily and quickly grasp the nut and rotate it when it is desired to connect the scraper to the cup, or to permit removal of said scraper from the cup. The nut is adapted to be turned with respect to the cup and to the stem of the scraper for the purpose of drawing the pinion, F, into tight engagement with the inner end face of said nut, whereby the nut, the scraper, the stem and the pinion are locked together so that the nut will rotate with the scraper, thus precluding the scraper from becoming detached accidentally from the nut.

H designates a reciprocating member in the form of a rod adapted to coöperate with pinion, F, for the purpose of rotating said pinion and the scraper to which it is attached. Said rod is provided on one side, near one end thereof, with a series of gear teeth, h, constituting a rack. The rack formed end of the rod is slidable freely in openings, $c'$, $c^2$, on the extension, b, of the cup, and the teeth, h, of said rod mesh or engage with pinion, F, substantially as shown in Figs. 1 and 3. The rod is guided in the openings of extension, b, and when said rod is moved endwise, its teeth, h, operate pinion, F, to rotate the scraper.

The frame, C, is shown in the form of a tube united rigidly at one end, as at $c^3$, to the cup or mold, the other end of said tube being provided with a socket, $c^4$, in which the handle, D, is secured. The socket is shown as having a lug, I, extending from one side thereof. Said lug is provided with a chamber, i, in which is housed or contained a coiled spring, J.

The operating member is in the form of a lever, K, which is fulcrumed at a point intermediate its ends on the lug, I, by means of a screw, k. Said member, K, is in the form of an angle lever, one arm of said angle lever forming a thumb piece, $k'$, and the other arm, $k^2$, being connected pivotally to rod, H, by a pin, $h'$. The knee portion of the angle operating lever is enlarged and chambered as at $k^3$, and this enlarged and chambered part, $k^3$, coöperates with the chambered part, i, of the lug, I, said chambered parts of the lever and the lug forming complements of a spring boxing or housing. Said boxing or housing receives the coiled spring, J, which loosely encircles the pivotal bolt or screw, k, whereby the spring is concealed from view and protected from injury and from accumulations of dust, etc. One end of the spring bears against a shoulder, l, extending inwardly from the wall of chambered lug, I, whereas the other end of said spring acts against an abutment, $l'$, which is provided interiorly of the chambered part, $k^3$, of operating lever, K.

The spring, J, acts on the angle lever to move it to the position shown in Figs. 1 and 2, the arm, $k^2$, of said lever engaging with a suitable stop, m, fixed on the socket portion, $c^4$, of the frame. The thumb piece, $k'$, of the lever stands outwardly from the handle, preferably at an angle thereto, and the rod, H, is partly drawn in to the extension, b, of the mold or cup. When it is desired to rotate the scraper for the purpose of cutting the cream free from the walls of the mold or cup, A, the operator presses on the thumb piece, $k'$, of lever, K, thus turning it against the tension of spring, J, and moving rod, H, through the opening, $c^2$, in the base of the cup. This movement of the rod is communicated to pinion, F, and the scraper is thus rotated within the cup for the purpose specified. When rotary motion is communicated to the scraper by the operation of lever, K, and the rod, H, the stem, E, turns with the scraper and the nut, G, rotates with the stem and the pinion.

In order to disconnect the scraper from the cup, it is only necessary for the operator to rotate nut, G, a few turns, whereupon the threaded part, e, of the stem is caused to work in the threaded part of the nut so that the stem is disconnected from the nut. The scraper can now easily be removed or it will drop out of place by inverting the cup to the positions of Figs. 2 and 3. On the withdrawal of the scraper, pinion, F, and stem, E are removed with said scraper from the extension, b, of the cup, but the displacement of the scraper and withdrawal of stem, E, and pinion, F, do not disturb the connection of nut, G, to the cup, nor do they affect the position of the rack formed end of rod, H. After cleaning the cup and the scraper, the latter may be replaced within the cup so that the pinion, F, and stem, E, will resume their relations to the extension, b, and nut, G. When the threaded part, e, of the stem enters the hollow part of the nut, said nut is rotated by hand for its threaded part to engage with the threads, e, of the stem, E, whereby the nut, G, is manipulated to attach the scraper rigidly to said nut for the reason that the threaded connection between the nut and the stem operates to draw an end face of pinion, F, firmly into engagement with the inner end face of the nut.

The dipper shown in Figs. 4 and 5 is quite similar in construction to the dipper of Figs. 1 to 3 inclusive, in so far as concerns the means for retaining the scraper in operative position within the cup or mold; but I have modified the scraper operating means so as to dispense with the lever, the spring, the rack and the pinion, and the parts coöperating therewith. Bowl, A', has the frame, C', attached rigidly thereto, said frame having a handle, D'. Scraper, B', comprises the members, b', b², said scraper being fitted for operation within the cup so as to have frictional contact with the inner surface thereof.

For the purpose of rotating the scraper, I employ an operating member, P, the same having a tubular body, p, adapted to fit within an open end of the cup and to turn freely therein. The operating member is provided with flanges, p², which are positioned exteriorly of the cup and are similar to the wings of a winged thumb nut so that the operating member may be easily rotated by hand. The operating member is retained in the small end of the cup by means of a disk or flange, O, adapted to fit snugly to the wall of the cup at a point close to the opening in the bottom thereof, and this disk, O, is united rigidly to the operating member by suitable means, as for example, by providing small openings, o, in the disk or washer, which openings, o, receive prongs that are extended from the tubular body of the operating member, said prongs being bent or headed against one face of the disk or washer. It will be understood that the disk or washer is attached rigidly to the operating piece so that it will turn therewith when said piece is operated by hand, and the diameter of said disk or washer exceeds the diameter or opening in the base of the cup, whereby the disk or washer precludes disengagement of the operating member from said cup. The disk or washer is provided with a square opening adapted to receive a squared part of the stem, E', said stem being fastened rigidly to the scraper. When the squared part of the stem fits in the squared opening of the disk or washer, the stem is caused to turn with the operating piece and the disk or washer, O, but when the nut is unscrewed from the threaded part, e', of the stem, then the scraper can be withdrawn from the bowl for the reason that the stem is free to slide endwise through the squared opening of the disk or washer.

The stem, E', is provided with a male threaded end portion, e'. The nut, G', is flanged to produce an annular groove in which is fitted a rib, q, of the operating member, P, whereby the operating member and the screw, G', are swiveled together so that the nut may be rotated with respect to stem, E', and operating member, P. The nut is screwed on the threaded part, E, of stem, E', so as to draw the scraper firmly against the disk or washer, O. When it is desired to rotate the scraper, the operator grasps wings, p², of member, P, and rotates said member, whereby the scraper turns with the operating member, and the stem, E', and nut, G', also rotate with said member. To disconnect the scraper, the operator turns nut, G, in order to unscrew it from the threaded part, e', of stem, E', whereupon the scraper will drop out of the mold because the stem, E', will slide easily through the opening in the disk or washer, O. To again connect the scraper to this operating means it is placed in the mold for the stem, E', to enter the squared opening in the washer, O, and hollow part of nut, G', after which the nut, G', is rotated relative to member, P, and the parts are drawn into firm frictional engagement so as to lock the operating member to the scraper.

The device shown in Figs. 1, 2 and 3 embodies a gear attached rigidly to the stem of the scraper and adapted to be removed with the scraper when the latter is withdrawn from the bowl or mold. In a preferred embodiment of the invention, illustrated in Fig. 6, the gear is separable from the scraper and the stem, so that the gear will remain in position on the closed bottom of the mold, and in engagement with the rack, whereby the scraper and the stem may be removed without disturbing any member of the operating mechanism.

The stem, E², is square for a part of its length, close to the end at which the stem is united to the scraper, the other end of said stem being provided with a male thread, e². The extension, b³, of the cup is partly closed on the side of the gear chamber just next to the mold chamber by a shoulder indicated at F³, and against this shoulder is seated one end face of the gear, F², said gear having a journal which enters the opening in the bottom of the mold or cup. Said gear, F², is provided with an axial opening which in cross section conforms to the squared part of the stem, whereby the stem is adapted to be slipped through the squared hole of the gear in the operations of inserting and removing the scraper, but when the squared part of the stem is secured in the square hole of the gear, then said gear is, practically, fast with the stem, so that the rack and gear when operated by the thumb lever, such as K, will impart rotary motion to the scraper. The nut, G², has a rotatable or swiveled connection with extension, b³, of the mold, and said nut may be rotated on the threaded part, e², of the stem. The rotation of the nut in one direction operates on the stem and draws the scraper into the mold, but by turning the nut in the opposite direction, the stem is disconnected from the nut, whereby the scraper can be removed, the stem sliding through the hole in the gear. The scraper can thus be connected to, and disconnected from, the bowl and the operating devices easily and quickly. Upon the removal of the scraper, the rack and the gear retain their positions within the extension of the bowl; in other words, the gear is not removable with the scraper, for the reason that the shoulder, F³, keeps the gear within the extension when the stem is withdrawn with the scraper. The gear is retained in place by the nut, G², and by the journal fitting in the bottom of the cup, and the square hole in said gear is visible to the operator when replacing the scraper, thus enabling the operator to readily insert the end of the stem into the gear when replacing the scraper.

As in the devices shown in Figs. 1, 2 and 3, the gear of the construction shown in Fig. 6 is adapted to be drawn into tight frictional engagement with the nut when the latter is screwed on the stem for the purpose of attaching the scraper, whereby said nut is adapted to rotate with the gear, thus precluding accidental separation of the scraper from the operating mechanism.

Having thus fully described the invention, what I claim as new, and desire to secure by Letters Patent is:

1. In an ice cream dipper, a cup, a scraper interiorly thereof, a rotatable nut connected with the cup for detachably holding the scraper in its operative position, and means for rotating the scraper.

2. In an ice cream dipper, a cup, a scraper positioned interiorly thereof, a stem extending from the base of the scraper, a rotatable nut engaging frictionally with the cup and coöperating with the stem for detachably retaining the scraper in its operative position, said nut being retained in operative position relative to the cup upon the removal of said scraper from the cup and the stem from the nut and means for rotating the scraper.

3. In an ice cream dipper, a cup, a scraper interiorly thereof, a stem extending from the base of the scraper, a nut coöperating with the stem for detachably retaining the scraper in its operative position, said nut being swiveled to a permanent element of the disher and adapted to remain in position upon the withdrawal of the scraper and the stem, a gear on said stem, and an operating rack meshing with the gear, whereby the scraper may be rotated.

4. In an ice cream dipper, a cup provided with a chamber at its closed part, a scraper provided with a member extending into said chamber, a nut frictionally engaging with a part of the cup and coöperating with the member for retaining the scraper in position, and a member separate from the retaining nut for operating the scraper, said scraper-operating member being incased within the chamber of the cup.

5. In an ice cream dipper, a cup provided with a scraper chamber and with a separate gear incasing chamber, a scraper provided with a stem, a gear fitted removably to the scraper, said gear being incased within said separate chamber and adapted to remain in position therein upon the withdrawal of the scraper and the stem from the cup, means for rotating the gear, and means for retaining the scraper and the stem in operative relation to the cup and the gear, respectively.

6. In an ice cream dipper, a cup, a scraper provided with a stem, a gear fitted removably to the scraper, said gear being incased within a part of the cup and adapted to remain in position therein upon the withdrawal of the scraper and the stem from the cup, means for rotating the gear, and a nut engaging frictionally with the cup and coöperating with the stem, whereby the scraper and the stem are retained in operative relation to the cup and the gear, respectively.

7. In an ice cream dipper, a cup, a removable scraper interiorly thereof, means for operating the scraper, a threaded stem extending from the scraper, and a nut coöperating with said stem to retain the scraper in operative position, said nut being connected with the cup and adapted to remain in position thereon upon the withdrawal of the stem and the scraper from the cup.

8. In an ice cream dipper, a cup, a removable scraper interiorly thereof, a threaded stem extending from the scraper, a nut swiveled upon a permanent part of the disher and coöperating with said stem for retaining the scraper in operative position, an operating gear fitted removably to the stem and positioned to remain in the cup upon the withdrawal of the stem and the scraper, and means for rotating said gear.

9. In an ice cream dipper, a cup, a removable scraper operable therein, a stem extending from the scraper, an operating gear fitted removably to the stem, said gear being positioned in the cup to remain therein upon the removal of the stem and the scraper, means for rotating the gear, and a retaining member coöperating with the stem for retaining the scraper in the cup.

10. In an ice cream dipper, a cup provided with a chamber, a removable scraper therein, a stem extending from the scraper, said stem being provided with a square part and a threaded part, a retaining member coöperating with the threaded part of the stem, and an operating gear fitted removably to the square part of the stem, said operating gear being retained within a chamber of the cup upon the removal of the scraper and the stem.

11. In an ice cream dipper, a cup provided with a chamber, a gear rotatably supported within said chamber, a removable scraper within the cup, a stem attached to the scraper and fitted removably in the gear, and means for rotating the gear, said gear being retained in the chamber of the cup upon the withdrawal of the scraper and the stem.

12. In an ice cream dipper, a bowl provided with a scraper chamber and with a separate gear-incasing chamber, a scraper positioned interiorly thereof, a gear coöperating with the scraper, said scraper being removable without disturbing the relation of the gear to the cup, said gear being incased within the separate chamber, means for rotating said gear, and retaining means coöperating with the scraper, said retaining means being separate from the gear and the operating means.

13. In an ice cream dipper, a bowl, a scraper positioned interiorly thereof, a stem extending from the scraper, a gear incased within a part of the cup and engaging with the stem, means for rotating the gear, means, independent of the scraper rotating means, engaging with the stem, and with a portion of the bowl for retaining the scraper in operative position, said scraper and the stem being withdrawable at will from the bowl and the gear, and means whereby the scraper retaining means is maintained against displacement from the bowl when the scraper is withdrawn.

14. In an ice cream dipper, a bowl having an extension forming a gear chamber, a gear retained normally in said chamber, a scraper interiorly of the bowl, a stem extending from the scraper and engaging with said gear, means for rotating the gear, separate retaining means engaging the stem, said scraper and the stem being withdrawable from the bowl, the gear and scraper retaining means, respectively, and means engaging with the scraper retaining means whereby said retaining means is maintained in operative position when the scraper is withdrawn.

15. In an ice cream dipper, a cup, a scraper therein, a stem attached to the scraper, means for operating the scraper, a retaining nut screwed on the stem, said retaining nut having an external groove, and a member coöperating with said groove for retaining the nut in position with respect to the cup and upon the withdrawal of the scraper and the stem from the cup and the retaining nut, respectively.

16. In an ice cream disher, a cup, a scraper interiorly thereof, a stem extending from the scraper, means for operating the scraper, a nut screwed on the stem and operating to retain the scraper in position, and means for connecting the nut with the cup whereby the nut is retained in operative relation to the cup upon the withdrawal of the scraper from the cup and the stem from the nut.

17. In an ice cream disher, a cup, a scraper interiorly thereof, a stem extending from the scraper, a nut screwed on the stem and operating to retain the scraper in position, means for connecting the nut with the cup whereby the nut is retained in operative relation to the cup upon the withdrawal of the scraper from the cup and the stem from the nut, and means for rotating the scraper within the cup.

18. In an ice cream disher, a cup, a scraper interiorly thereof, a stem extending from the scraper, means for operating the scraper, said stem being threaded and provided with a square portion, a scraper rotating member engaging the square portion of the stem, a nut screwed on the threaded part of the stem for retaining the scraper in position within the cup, and means coöperating with the cup and the nut for retaining said nut in operative relation to the cup upon the withdrawal of the scraper and the stem from the cup and the nut respectively.

19. In an ice cream disher, a frame, a cup thereon, a scraper positioned interiorly of the cup, a stem attached to the scraper, a spring-pressed lever fulcrumed on the frame, a stop for limiting the movement of the lever in the spring-pressed direction, rack and gear mechanism for operatively connecting the lever with the scraper stem, whereby the scraper may be rotated within the cup, and a scraper-retaining member separate from the scraper rotating means for retaining the scraper and stem in operative position within the cup, said scraper-retaining member being connected with the cup to remain in operative position thereon upon the withdrawal of the scraper and the stem from the cup and the scraper rotating means, respectively.

20. In an ice cream disher, the combination of a cup, a scraper interiorly thereof, a stem extending from said scraper, means acting through the stem for imparting motion to the scraper, and a scraper retaining member in engagement with the cup, independent of the scraper, said retaining member coöperating with the stem of the scraper whereby it is adapted to retain said scraper in operative position in the bowl independently of the scraper operating means.

21. In an ice cream disher, the combination of a cup, a scraper interiorly thereof, a stem extending from said scraper, scraper rotating means, and a scraper retaining member adapted to normally preclude the removal of the scraper from the cup, coöperating directly with the cup and the stem, said scraper retaining member being independent of the scraper and also independent of the scraper rotating means in carrying out its function of retaining the scraper in the cup.

22. In an ice cream disher, a cup provided with a scraper chamber and a gear chamber, a scraper positioned within the scraper chamber, a stem extending from the scraper and entering the gear chamber, a gear positioned within the gear chamber and coöperating with the stem, means for imparting rotary motion to the gear, and a scraper retaining member mounted for rotation on the cup and adapted to coöperate with the stem, said scraper retaining member being independent of the scraper and also independent, for its operation, upon contact with the scraper operating means, and said scraper retaining member being fixed to the cup against disengagement therefrom whereby said retaining member is maintained in its operative position when the scraper and its stem are withdrawn from the cup.

23. In an ice cream disher, a frame, a cup thereon, a scraper detachably positioned interiorly of the cup, a stem attached to the scraper, a spring-pressed lever fulcrumed on the frame, a stop for limiting the movement of the lever in the spring-pressed direction, rack and gear mechanism for operatively connecting the lever with the scraper stem, whereby the scraper may be rotated within the cup, and a scraper-retaining member separate from the scraper rotating means and independent of the scraper for retaining the scraper and stem in operative position within the cup, said scraper-retaining member being fixed to the cup against displacement, whereby said scraper retaining means is maintained in its operative position when the scraper is withdrawn from the cup.

In testimony whereof I have signed my name to this specification in the presence of two subscribing witnesses.

EDWIN WALKER.

Witnesses:
C. D. HIGBY,
C. L. WALKER.

Copies of this patent may be obtained for five cents each, by addressing the " Commissioner of Patents Washington, D. C."